Figure 1:
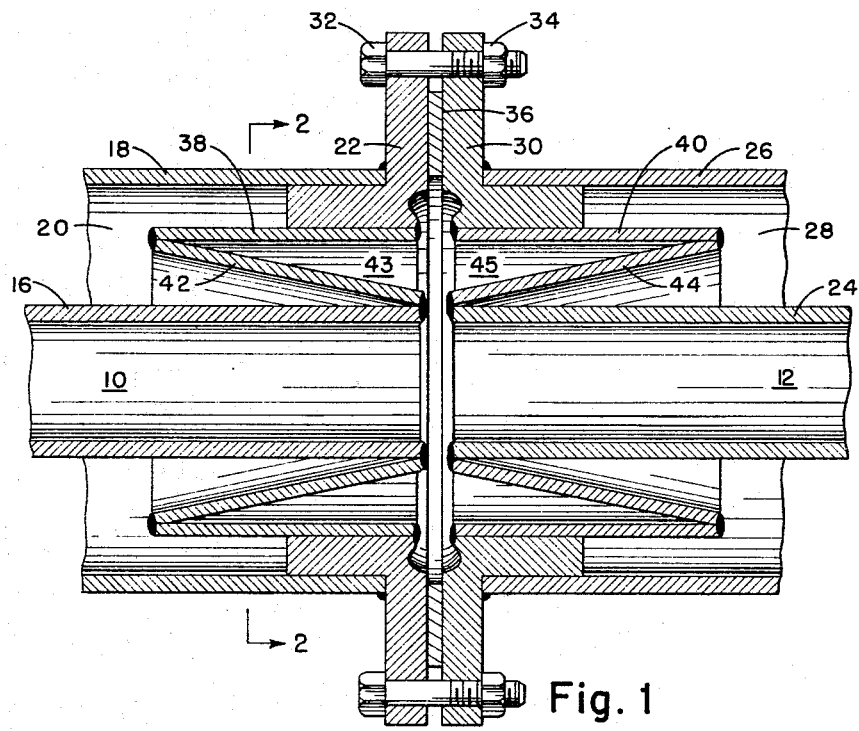

Sept. 27, 1966 S. S. WALDRON ETAL 3,275,345
CONDUIT SYSTEM AND COUPLING MEANS THEREFOR, FOR
CONVEYING CRYOGENIC FLUIDS Filed March 30, 1964 2 Sheets-Sheet 1

Stoddard S. Waldron
Gustave A. Bleyle, Jr.
INVENTORS

BY

Stoddard S. Waldron
Gustave A. Bleyle, Jr.
*INVENTORS*

BY
Agent

United States Patent Office 3,275,345
Patented Sept. 27, 1966

3,275,345
CONDUIT SYSTEM AND COUPLING MEANS THEREFOR, FOR CONVEYING CRYOGENIC FLUIDS
Stoddard S. Waldron, Woodland Hills, and Gustave A. Bleyle, Jr., Pacific Palisades, Calif., assignors to Arthur D. Little, Inc., Cambridge, Mass., a corporation of Massachusetts
Filed Mar. 30, 1964, Ser. No. 355,834
9 Claims. (Cl. 285—47)

This application is a continuation-in-part of our copending application Serial Number 289,033 filed June 19, 1963.

This invention relates to couplings for fluid-carrying lines, and in particular to couplings for use in vacuum jacketed lines carrying liquefied gases at very low temperature, e.g. liquid hydrogen.

For many years there has been a need for a universal coupling for use on vacuum jacketed lines transporting cryogens and specifically for liquid hydrogen. Such couplings must be carefully designed to minimize heat leak into the system. With liquid hydrogen coming into greater and greater use in missile and space applications, a reliable, rugged, simple and inexpensive coupling is in increasing demand. Nevertheless the couplings now available for such purposes, though effective, are generally quite complicated and expensive to build. Typical of such couplings is that shown in United States Patent 2,858,146.

Most of the low heat leak couplings now in use have been of the male and female re-entrant type, and have been subject to damage in use because of their relatively complicated construction. It would accordingly be desirable to eliminate such an arrangement, in order to make the coupling easier to assemble, to avoid the necessity for a substantial clearance space when joining the parts, and to provide a relatively simple type of structure.

Another type in common use is the continuous inner pipe arrangement wherein the inner pipe is joined either by welding or by flanges, with a suitable insulation placed over the joint and the overall coupling suitably housed, such that it can be evacuated if desired. It is desirable to provide a coupling that eliminates the inherent problems of assembly and disassembly of this type of coupling, and which does not have the cooldown problems of the flanged inner pipe coupling.

In accordance with the present invention we provide a separable coupling which is also a good insulator; which has no thin metal sections exposed to possible damage in assembly or use; which is simple, and inexpensive to fabricate; which has low mass next to the transport fluid and hence low cooldown requirement; wherein the pressure seal is located such that it will be close to ambient temperature; which requires no reinsulating once fabricated nor does it require evacuation; and wherein mating problems are eliminated as each coupling half is the same as each other coupling half. Furthermore, retraction clearance may be as little as one inch, or none at all may be needed.

Figure 3:
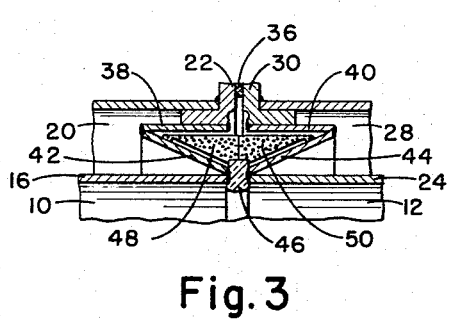
Figure 2:
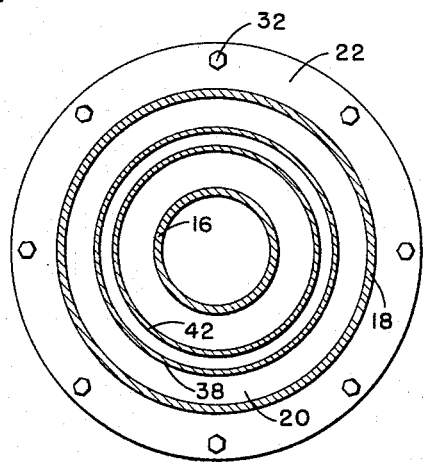
Figure 4:
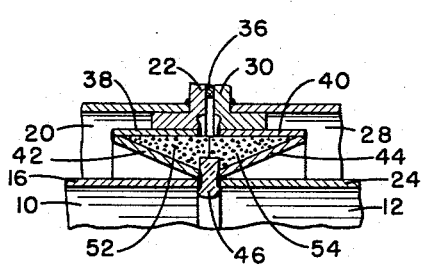
Figure 5:
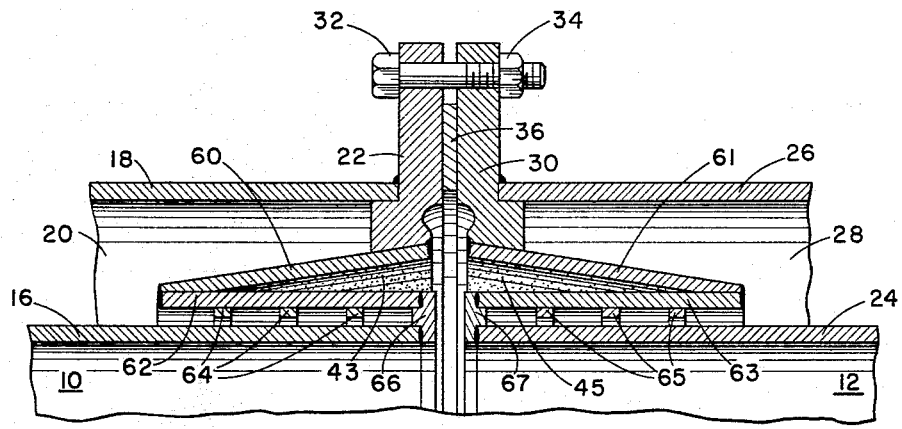
Figure 6:
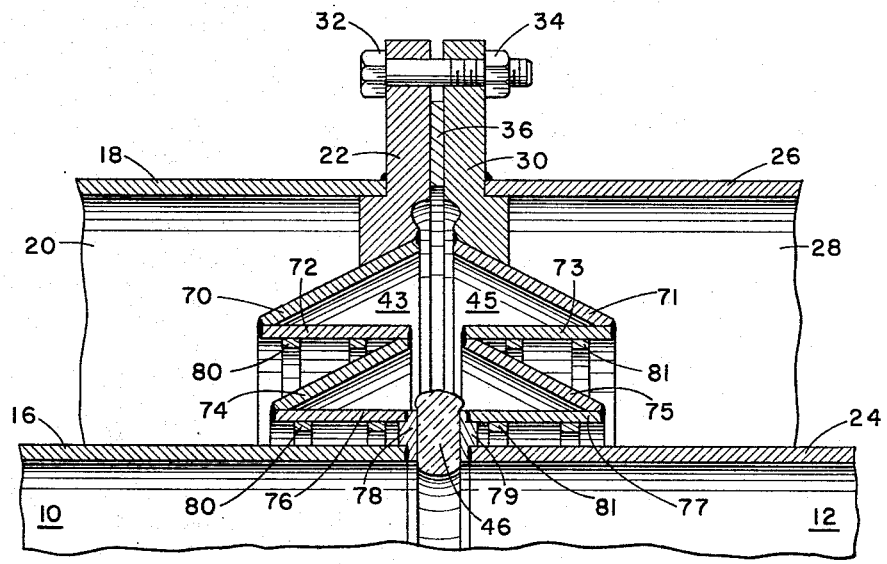

This invention will now be described in connection with the accompanying drawings, which are intended to be illustrative rather than limiting, and in which:

FIG. 1 represents a longitudinal cross sectional view through one form of the assembled coupling;

FIG. 2 represents a transverse cross section of the coupling along line 2—2 of FIG. 1; and FIGS. 3 and 4 represent cross sectional views of forms of the anti-convection/insulator insert and the flow restrictor features of the coupling; and FIGS. 5 and 6 represent cross sectional views of the coupling, showing alternative forms of the heat flow resistance paths.

The coupling assembly shown in FIG. 1 consists basically of two vacuum jacketed lines or conduits 10 and 12, each terminating in the coupling member herein described. Line 10 is provided with inner wall 16, outer wall 18 and vacuum space 20 between them. Vacuum space 20 may, if desired, contain insulating material, such as any of the dry divided powdery materials commonly used for the purpose. Flange 22 is welded to wall 18.

Line 12 is provided with inner wall 24, outer wall 26, and the vacuum space 28 therebetween, and has a flange 30 similar to flange 22 and opposed thereto. Flanges 22 and 30 are secured together by suitable means such as bolts 32 and nuts 34, with a seal member 36 between the two flanges. By tightening nut 34 on bolt 32, the flanges 22 and 30, and hence the lines 10 and 12, are brought together for the desired fluid flow through them.

The heat flow resistance paths are formed of alternating cylindrical and frusto-conical elements—or they may all be frusto-conical—providing a pleated or zig-zag extended heat path between the inner walls 16, 24 and the outer walls 18 and 26, respectively. As shown in FIG. 1, the heat flow resistance paths are formed of cylindrical elements 38, 40 and frusto-conical elements 42, 44 which are welded, formed integrally with, or otherwise attached air-tight to elements 38 and 40 respectively and to inner walls 16 and 24 respectively. Elements 38, 40 are similarly attached to flanges 22 and 30 respectively, thereby forming, with elements 42 and 44, a gas-tight seal at the facing ends of vacuum spaces 20 and 28, respectively. Optionally, as shown in FIGS. 3 and 4, an annular gasket or flow restrictor assembly 46 provides flow restriction between the interior of lines 10 and 12 and the spaces 43, 45 defined by elements 38, 40, 42 and 44. This gasket or flow restrictor assembly is of dense felt or other suitable material or materials which are not damaged by the severe temperature changes and conditions to which it is subjected, in use, or by the fluids passing through lines 10, 12.

As shown in FIGS. 3 and 4, the spaces 43, 45 of FIG. 1 may be partly or wholly filled with balsa, polyurethane foam, or other suitable formed material or materials 48, 50 which serves as insulation and anti-convection material. This may be preformed and then placed in spaces 43, 45, as shown in FIG. 3, or may be foamed in place in each of said spaces and then shaped after foaming into configurations 52, 54 so that said materials, 48 and 50 or 52 and 54 will press together on assembly. Gasket 46 may be attached to one of the inserts 48, 50 (FIG. 3) or foamed configurations 52, 54 (FIG. 4). The latter are, of course, appropriately recessed to accommodate gasket or flow restrictor assembly 46 when they are shaped.

The heat flow resistance paths may take other zigzag forms, as shown for example in FIGS. 5 and 6. Thus, the cylindrical elements 62, 63 may be nearest the inner wall 16 and the frusto-conical elements 60, 61 nearest the outer wall 18, as shown in FIG. 5. In the arrangement of FIG. 5, the cylindrical elements 62, 63 are provided with stiffening rings 64, 65, welded or otherwise attached thereto, and the flanges 22, 30 taper downwardly to rest against conical elements 60, 61. This arrangement provides supporting strength for the elements of the heat flow resistance paths against buckling or collapse when the pressure differential is high, e.g. 150 p.s.i. between the interior of lines 10, 12 and vacuum spaces 20, 28. With this type of support, the elements of the heat flow resistance paths may be made thinner than otherwise, thus offering greater resistance to heat flow. Instead of using stiffening rings, the elements may be formed with thick circumferential ridges spaced at suitable intervals; such an arrangement, however, is generally less practical and is more complex to manufacture. Cyclindrical elements 62, 63 are connected gas-tight with walls 16, 18 through seal faces 66, 67; these latter serve to space the elements from the walls. Hence vacuum spaces 20, 28 are effectively sealed by gas-tight elements extending from wall 16 to wall 18, and from wall 24 to wall 26, respectively.

Another arrangement of the heat flow resistance paths is shown in FIG. 6, wherein two pairs of frusto-conical elements 70, 71 and 74, 75 alternate with two pairs of cylindrical elements 72, 73 and 76, 77 to form, with flanges 22, 30 and seal faces 78, 79, gas-tight seals between outer walls 18, 26 and inner walls 16, 24 respectively, thereby sealing vacuum spaces 20, 28 from the pressure existing in spaces 43, 45.

Stiffening rings may be affixed to, or made integral with the cylindrical elements, if desired, as shown at 80, 81 (FIG. 6).

Flow restrictor assembly 46 may be used between the seal faces of the arrangements of FIGS. 5 and 6, as shown in FIG. 6 for example.

Similarly, anti-convection material may be used in spaces 43, 45 of the arrangements of FIGS. 5 and 6, as shown in FIGS. 3 and 4.

In the arrangement shown in the drawings, the coupling members are of circular cross section, as shown in FIG. 2. It is, however, possible to have other types of configuration such as angular, although such construction is not preferred as it is ordinarily more difficult to fabricate and to assemble.

The seal arrangement of this invention serves to insulate the liquefied gas within the coupling from heat leaking into the system from the flanges 22, 30. Seal member 36 is effective to prevent leakage of fluid (gaseous or liquid) from within the coupling to the exterior. As seal member 36 is not greatly below ambient temperature, it readily provides a tight seal, and it may be made of any suitable material and configuration commonly used for sealing purposes.

To assemble this coupling, it is merely necessary to bring lines 10 and 12 together, and then bolt them together with nuts 32 and bolts 34 in flanges 22, 30, and with seal member 36 and gasket or flow restrictor assembly 46 (if used) and the anti-convection/insulator elements (if used) in place. To disassemble, these nuts and bolts are removed and lines 10 and 12 pulled apart.

It is clear that the coupling arrangement of this invention prevents minimum assembly and disassembly problems. Minimum retraction is required; there is no need to refill spaces 43 and 45 (if anti-convection/insulator filling is used), once initial fabrication is accomplished; and the two halves of the coupling arrangement are of the same configuration in a reverse sense, and hence no problem of proper mating of dissimilar halves exits. This latter problem is relatively serious in most low heat leak couplings which are presently available.

What is claimed is:

1. A termination for conduit means comprising an inner hollow conduit for conveying a liquefied gas and an outer hollow conduit surrounding said inner conduit and spaced therefrom for defining an evacuated space therebetween, said termination being adapted for coupling to another termination of identical configuration, said termination comprising:
   (a) respective one ends of each of said conduits positioned adjacent one another approximately in a common plane;
   (b) flange means mounted on and extending outwardly from said outer conduit adjacent said one end thereof; and
   (c) means sealing said ends together and including:
       (i) at least one substantially rigid, hollow, frustoconical member sealed at one extremity to one of said ends and extending into said evacuated space,
       (ii) at least one substantially rigid, hollow, elongated substantially cylindrical member sealed at one of its extremities to the other of said ends, and at the other of its extremities to the other extremity of said frustoconical member, and
       (iii) at least one circumferential reinforcing ring mounted on and extending from said elongated member toward the conduit to which said extremity of said elongated member is sealed.

2. A termination as defined in claim 1 wherein said elongated member is provided with a plurality of circumferential reinforcing rings spaced from one another and extending outwardly from said elongated member toward the conduit most adjacent.

3. A termination for conduit means comprising a substantially cylindrical, inner hollow conduit for conveying a liquefied gas, and a substantially cylindrical, outer hollow conduit surrounding said inner conduit and spaced therefrom for defining an evacuated space therebetween, said termination being adapted for coupling to another termination of identical configuration, said termination comprising:
   (A) respective one ends of said conduits positioned adjacent one another approximately in a common plane;
   (B) flange means mounted on and extending outwardly from said outer conduit adjacent said one end thereof, and including an annular portion extending across said one end thereof and into the space between said conduits; and
   (C) a pleated element comprising a plurality of substantially rigid, elongated cylindrical members of different diameters interleaved alternately with a like plurality of substantially rigid elongated frustoconical members of different mean diameters, all of said members having first extremities disposed substantially in said plane and second extremities disposed substantially in another plane;
       the member of largest diameter having its first extremity sealed to said annular portion of said flange;
       the member of smallest diameter having its first extremity sealed to said end of said inner conduit;
       all others of said first extremities being sealed to one another and all of said second extremities being sealed to one another and within said space;
       the cylindrical member next adjacent one of said conduits being provided with at least one circumferential reinforcing ring extending therefrom toward said one of said conduits, each other cylindrical member being provided respectively with at least one circumferential reinforcing ring extending therefrom toward the adjacent frustoconical member to which the first extremity of said each other cylindrical member is sealed.

4. A coupling assembly comprising a pair of conduit means adapted to convey liquefied gas, and comprising:
   (A) at least a pair of conduits, each including:
       (a) an inner pipe for conveying a liquefied gas and an outer pipe surrounding said inner pipe and spaced therefrom for defining an evacuated space therebetween, said inner and outer pipe having a common termination defined by respective one ends thereof disposed substantially in a common plane;
       (b) flange means mounted on and extending outwardly from said outer pipe adjacent said end of the latter; and
       (c) means sealing said ends of said pipes to one another and including:
           (i) at least one substantially rigid frustoconical member sealed at one extremity to one of said ends and extending into said evacuated space, and (ii) at least one substantially rigid, hollow, elongated cylindrical member sealed at one of its extremities to the other of said ends, and at the other of its extremities to the other extremity of said frustoconical member, and (iii) circumferential reinforcing rings mounted on and extending from said cylindrical member toward the pipe next adjacent said cylindrical member, (B) means connectable with each of said flange means for clamping said conduits together at respective identical terminations thereof so that the inner and outer pipes of each conduit are substantially colinear with one another; and (C) an outer seal member disposed annularly at least between said flanges.

5. A coupling assembly as defined in claim 4 including an annular sealing member disposed between facing ends of said inner pipes.

6. A coupling assembly as defined in claim 5 wherein the space defined by said frustoconical members and between clamped conduits is substantially filled with heat-insulating and anti-convection material.

7. A coupling assembly comprising a pair of conduit means adapted to convey liquefied gas, and comprising:

(A) at least a pair of conduits, each including, (a) an inner pipe for conveying a liquefied gas and an outer pipe surrounding said inner pipe and spaced therefrom for defining an evacuated space therebetween, said inner and outer pipe having a common termination defined by respective one ends thereof disposed substantially in a common plane;

(b) flange means mounted on and extending outwardly from said outer conduit adjacent said one end thereof, and including an annular portion extending across said one end thereof and into the space between said conduits; and (c) a pleated element comprising a plurality of substantially rigid, elongated cylindrical members of different diameters interleaved alternately with a like plurality of substantially rigid elongated frustoconical members of different mean diameters, all of said members having first extremities disposed substantially in said plane and second extremities disposed substantially in another plane;

the member of largest diameter having its first extremity sealed to said annular portion of said flange;

the member of smallest diameter having its first extremity sealed to said end of said inner conduit;

all others of said first extremities being sealed sealed to one another and all of said second extremities being sealed to one another;

the cylindrical member next adjacent one of said conduits being provided with at least one circumferential reinforcing ring extending therefrom toward said one of said conduits, each other cylindrical member being provided respectively with at least one circumferential reinforcing ring extending therefrom toward the adjacent frustoconical member to which the first extremity of said each other cylindrical member is sealed;

(B) means connectable with each of said flange means for clamping said conduits together at respective identical terminations thereof so that the inner and outer pipes of each conduit are substantially colinear with one another; and (C) an outer seal member disposed annularly at least between said flanges.

8. A coupling assembly as defined in claim 7 including an inner, annular seal member disposed between facing ends of said inner pipes.

9. A coupling assembly as defined in claim 8 wherein the space defined by said frustoconical and cylindrical members and between clamped conduits is substantially filled with heat-insulating and anti-convection material.

References Cited by the Examiner

UNITED STATES PATENTS

| 2,419,278 | 4/1947 | Motsenbocker | 138—149 X |
| 2,451,146 | 10/1948 | Baker et al. | 138—149 |
| 2,930,407 | 3/1960 | Conley et al. | 138—148 X |
| 3,068,026 | 12/1962 | McKamey | 285—47 |
| 3,146,005 | 8/1964 | Peyton | 285—47 |

FOREIGN PATENTS

| 211,397 | 4/1956 | Australia. |
| 370,638 | 1/1906 | France. |

OTHER REFERENCES

Tantum et al.: Article in "Advances in Cryogenic Engineering," volume 4, pp. 326 to 334, published by Plenum Press, Inc., New York, 1960.

M. CARY NELSON, *Primary Examiner.*

HENRY T. KLINKSIEK, *Examiner.*